(12) United States Patent
Cao et al.

(10) Patent No.: US 10,822,173 B2
(45) Date of Patent: Nov. 3, 2020

(54) LINKING SYSTEM AND METHOD

(71) Applicants: Tyco Electronics (Shanghai) Co. Ltd., Shanghai (CN); TE Connectivity Corporation, Berwyn, PA (US)

(72) Inventors: Jian Cao, Shanghai (CN); Lvhai Hu, Shanghai (CN); Fengchun Xie, Shanghai (CN); Yun Liu, Shanghai (CN); Xiaochen Yu, Shanghai (CN); Roberto Francisco-Yi Lu, Bellevue, WA (US)

(73) Assignees: Tyco Electronics (Shanghai) Co. Ltd., Shanghai (CN); TE Connectivity Corporation, Berwyn, PA (US)

( * ) Notice: Subject to any disclaimer, the term of this patent is extended or adjusted under 35 U.S.C. 154(b) by 0 days.

(21) Appl. No.: 16/245,782

(22) Filed: Jan. 11, 2019

(65) Prior Publication Data

US 2019/0210809 A1    Jul. 11, 2019

(30) Foreign Application Priority Data

Jan. 11, 2018    (CN) .......................... 2018 1 0026778

(51) Int. Cl.
*B65G 47/90*    (2006.01)
*B65G 1/04*    (2006.01)
*B65B 5/06*    (2006.01)
*B65G 17/06*    (2006.01)
*B25J 15/00*    (2006.01)

(52) U.S. Cl.
CPC ........ *B65G 17/065* (2013.01); *B25J 15/0014* (2013.01); *B65B 5/06* (2013.01); *B65G 1/04* (2013.01); *B65G 47/901* (2013.01)

(58) Field of Classification Search
None
See application file for complete search history.

(56) References Cited

U.S. PATENT DOCUMENTS 8,657,550 B2 * 2/2014 Ford ................. G01N 35/0099
414/222.12
10,112,776 B2 * 10/2018 Rasi ..................... B65B 25/146

* cited by examiner

*Primary Examiner* — Kavel Singh
(74) *Attorney, Agent, or Firm* — Barley Snyder

(57) ABSTRACT

A linking system adapted to link a plurality of products comprises a supply device having a tray with a slide slot adapted to load a first row of products therein, a gripping device having a gripper adapted to grip the first row of products and a moving mechanism adapted to move the gripper, and a holder adapted to hold the first row of products. The gripping device is adapted to move the first row of products from the supply device to a holding position on the holder and the holder is adapted to hold the first row of products at the holding position. The gripping device is further adapted to grip a second row of products from the supply device and link the second row of products to the first row of products held by the holder.

20 Claims, 4 Drawing Sheets ns and the vertical moving mechanism 220 is a vertical
LINKING SYSTEM AND METHOD

CROSS-REFERENCE TO RELATED APPLICATION

This application claims the benefit of the filing date under 35 U.S.C. § 119(a)-(d) of Chinese Patent Application No. 201810026778.8, filed on Jan. 11, 2018.

FIELD OF THE INVENTION

The present invention relates to a linking system and, more particularly, to a linking system adapted to link a plurality of products.

BACKGROUND

A plurality of products are sometimes linked into a string for easy storage and transportation. A connector, for example, may have a hook formed on one side thereof and a slot formed on the other side thereof. The hook of one connector is adapted to be latched into the slot of another connector. Two connectors may thus be linked together by latching the hook of one connector into the slot of the other connector; a plurality of connectors, such as ten or more, may be linked into a string in this way. The connectors are currently linked manually, however, the efficiency of manually linking the connectors is very low because only one can be linked at a time.

SUMMARY

A linking system adapted to link a plurality of products comprises a supply device having a tray with a slide slot adapted to load a first row of products therein, a gripping device having a gripper adapted to grip the first row of products and a moving mechanism adapted to move the gripper, and a holder adapted to hold the first row of products. The gripping device is adapted to move the first row of products from the supply device to a holding position on the holder and the holder is adapted to hold the first row of products at the holding position. The gripping device is further adapted to grip a second row of products from the supply device and link the second row of products to the first row of products held by the holder.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
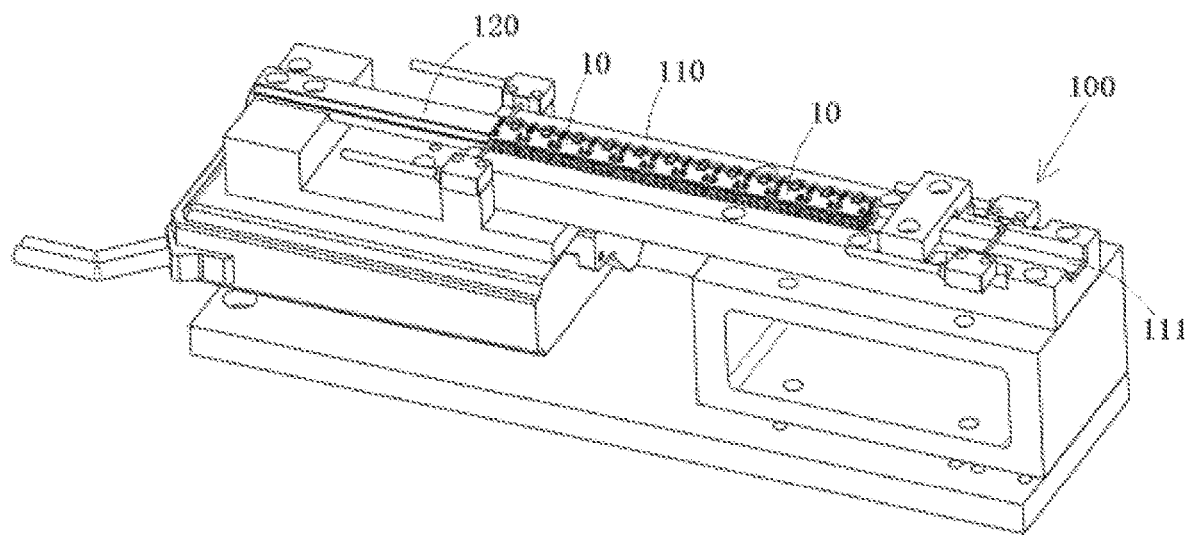
FIG. 1 is a perspective view of a supply device of a linking system according to an embodiment.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will convey the concept of the invention to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
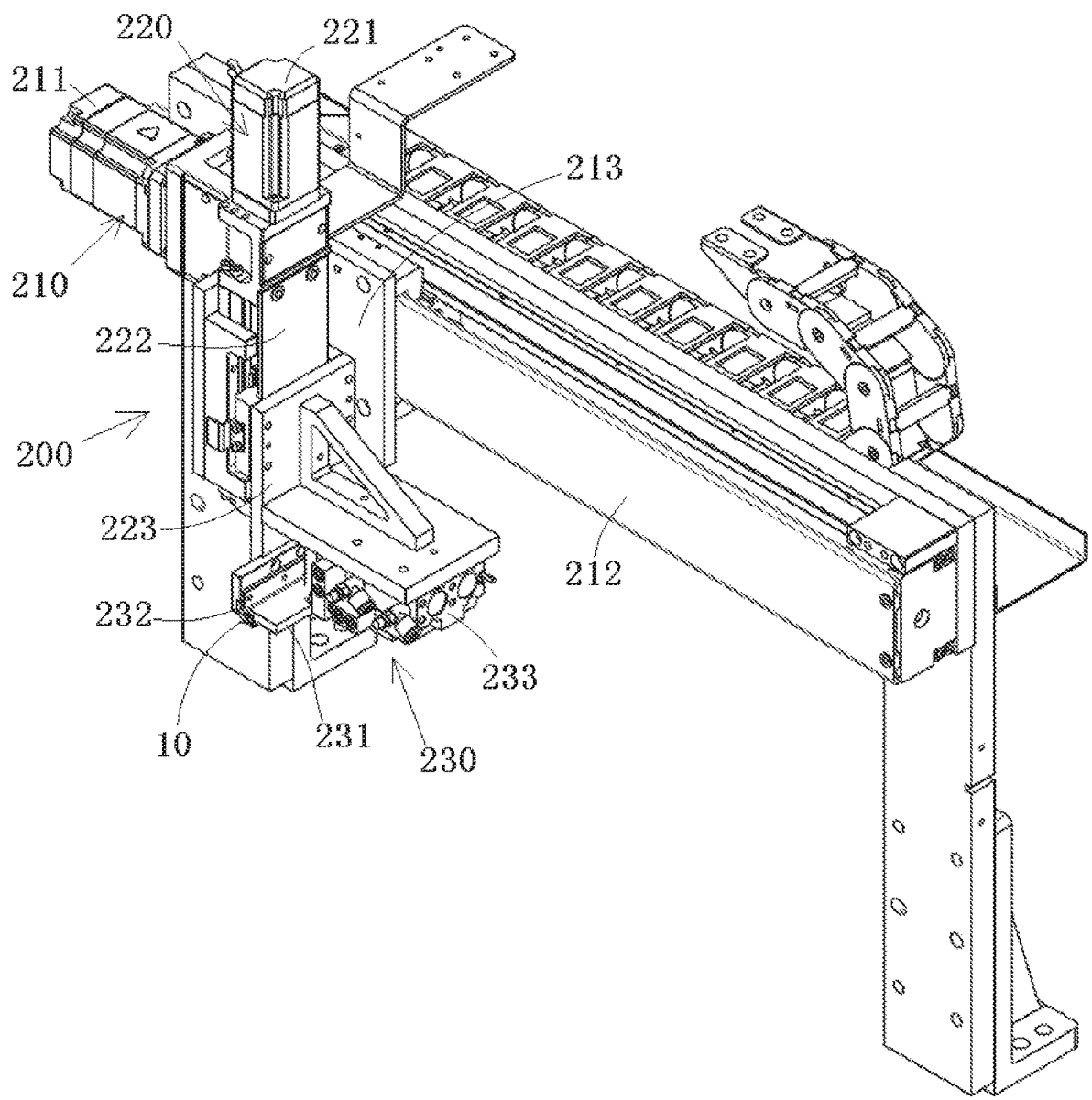
FIG. 2 is a perspective view of a gripping device of the linking system.
Figure 3:
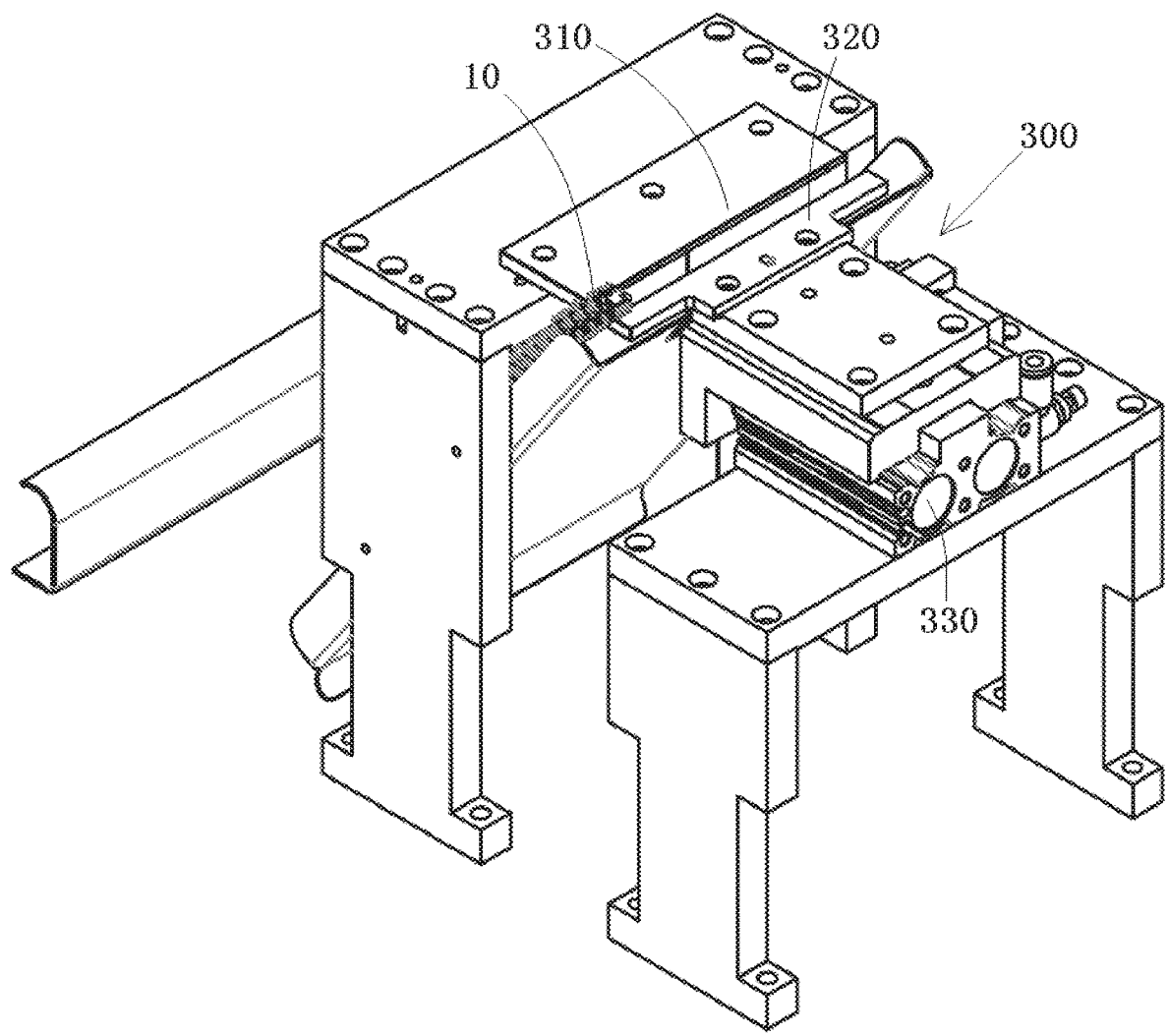
FIG. 3 is a perspective view of a holder of the linking system.

A linking system according to an embodiment, as shown in FIGS. 1-3, comprises a supply device 100, a gripping device 200, and a holder 300.

The supply device 100, as shown in FIG. 1, includes a tray 110. A slide slot 111 adapted to load a row of products 10 therein is formed in the tray 110. The gripping device 200, as shown in FIG. 2, includes a gripper 230 adapted to grip the row of products 10 and a moving mechanism 210, 220 adapted to move the gripper 230. The holder 300, shown in FIG. 3, is adapted to hold the row of products 10.

As shown in FIGS. 1-3, the gripping device 200 is adapted to grip and move a first row of products 10 from the supply device 100 to a holding position on the holder 300, and the holder 300 is adapted to hold the first row of products 10 at the holding position. The gripping device 200 is further adapted to grip and move a second row of products 10 from the supply device 100 and link the gripped second row of products 10 to the first row of products 10 held by the holder 300. The holder 300 releases the first row of products 10 after the second row of products 10 is linked to the first row of products 10. After holder 300 releases the first row of products 10, the gripping device 200 moves the gripped second row of products 10 to the holding position on the holder 300 to hold the second row of products 10 at the holding position by the holder 300. This process can be repeated for any number of rows of products 10.

Figure 4:
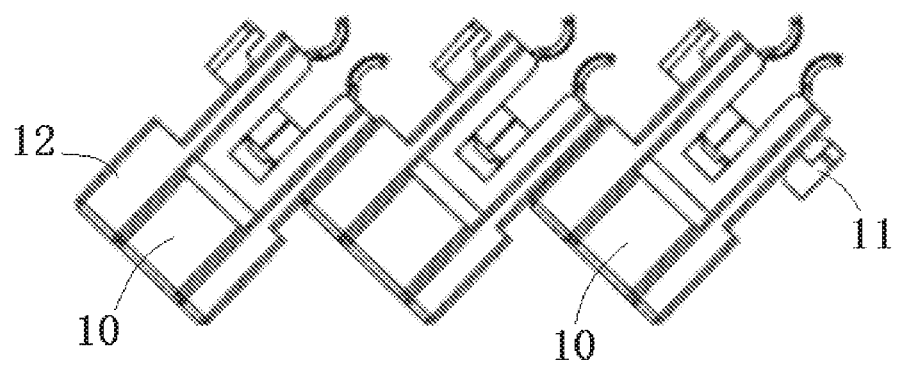
FIG. 4 is a perspective view of a plurality of products linked by the linking system.

A plurality of products 10 linked by the linking system are shown in FIG. 4. As shown in FIG. 4, in an embodiment, the linking system is adapted to link the plurality of products 10 as a string. A hook 11 is formed on one side of each product 10, and a slot 12 is formed in the other side of each product 10. The hook 11 of one product 10 is adapted to be latched into the slot 12 of another product 10, so as to link products 10 together.

In an embodiment, the supply device 100 includes a conveying mechanism, for example, a conveying belt. The conveying mechanism is configured to convey the second row of products 10 from one end of the tray 110 into the slide slot 111 of the tray 110 after the first row of products 10 on the tray 110 is taken away by the gripping device 200. The supply device 100, as shown in FIG. 1, includes a driving device 120 mounted on the other end of the tray 110 and having a shaft inserted into the slide slot 111 of the tray 110. An effective length of the slide slot 111 may be adjusted by controlling a length of the shaft, extending into the slide slot 111, of the driving device 120, so that the effective length of the slide slot 111 is consistent with a length of the row of products 10. In an exemplary embodiment, the driving device 120 is an electric cylinder or a cylinder.

The moving mechanism 210, 220, as shown in FIG. 2, includes a horizontal moving mechanism 210 and a vertical moving mechanism 220 mounted on the horizontal moving mechanism 210. The gripper 230 is mounted on the vertical moving mechanism 220. In an embodiment, the horizontal moving mechanism 210 is a horizontal servo drive mechanism and the vertical moving mechanism 220 is a vertical servo drive mechanism. The horizontal moving mechanism 210 includes a horizontal rail 212, a first slider 213 slidably mounted on the horizontal rail 212, and a first servo driving device 211 adapted to drive the first slider 213 to slide along the horizontal rail 212. The vertical moving mechanism 220 includes a vertical rail 222, a second slider slidably mounted on the vertical rail 222, and a second servo driving device 221 adapted to drive the second slider 223 to slide along the vertical rail 222. The vertical rail 222 is connected to the first slider 213 of the horizontal moving mechanism 210 and the gripper 230 is mounted on the second slider 223 of the vertical moving mechanism 220.

As shown in FIG. 2, the gripper 230 includes a pair of gripping plates 231, 232 and a driving cylinder 231, 232. The row of products 10 is adapted to be clamped between the pair of gripping plates 231, 232. The drive cylinder 231, 232 is adapted to drive the pair of gripping plates 231, 232 to open or close, so as to release or clamp the row of products 10.

The holder 300, as shown in FIG. 2, includes a pair of clamping plates 310, 320 and a driver 330. The row of products 10 is adapted to be clamped between the pair of clamping plates 310, 320. The driver 330 is adapted to drive the pair of clamping plates 310, 320 to open or close, so as to release or clamp the row of products 10.

A method of linking products 10 using the linking system will now be described with reference to FIGS. 1-4. The method comprises steps of:

providing the linking system;

conveying a first row of products 10 into the slide slot 111 of the tray 110;

gripping and taking away the first row of products 10 from the tray 110 with the gripping device 200, and then conveying a second row of products 10 into the slide slot 111 of the tray 110;

moving the first row of products 10 to the holding position on the holder 300 with the gripping device 200;

holding the first row of products 10 at the holding position with the holder 300;

gripping and taking away the second row of products 10 from the tray 110 with the gripping device 200, and then conveying a third row of products 10 into the slide slot 111 of the tray 110;

linking the gripped second row of products 10 to the first row of products 10 with the gripping device 200;

releasing the first row of products 10 by opening the holder 300;

moving the gripped second row of products 10 to the holding position on the holder 300 with the gripping device 200, and then holding the second row of products 10 with the holder 300;

gripping and taking away the third row of products 10 from the tray 110 with the gripping device 200, and then conveying a next row of products 10 into the slide slot 111 of the tray 110; and linking the gripped third row of products 10 to the second row of products 10 with the gripping device 200.

The linking system according to the embodiments described herein automatically links all products 10 in one row of products 10, for example the first row of products 10, to the respective products 10 in another row of products 10, for example the second row of products 10, at a time, improving the linking efficiency of the products 10.

What is claimed is:

1. A linking system adapted to link a plurality of products, comprising:

a supply device having a tray with a slide slot adapted to load a first row of products therein;

a gripping device having a gripper adapted to grip the first row of products and a moving mechanism adapted to move the gripper, the moving mechanism including a horizontal moving mechanism and a vertical moving mechanism mounted on the horizontal moving mechanism, the gripper mounted on the vertical moving mechanism; and a holder adapted to hold the first row of products, the gripping device is adapted to move the first row of products from the supply device to a holding position on the holder and the holder is adapted to hold the first row of products at the holding position, and the gripping device is further adapted to grip a second row of products from the supply device and link the second row of products to the first row of products held by the holder.

2. The linking system of claim 1, wherein the holder releases the first row of products after the second row of products is linked to the first row of products.

3. The linking system of claim 2, wherein the gripping device moves the second row of products to the holding position to hold the second row of products at the holding position with the holder.

4. The linking system of claim 1, wherein the supply device includes a conveying mechanism configured to convey the second row of products from a first end of the tray into the slide slot of the tray after the first row of products on the tray is taken away by the gripping device.

5. The linking system of claim 4, wherein the supply device includes a driving device mounted on a second end of the tray opposite the first end of the tray and including a shaft inserted into the slide slot of the tray.

6. The linking system of claim 1, wherein the gripper includes a pair of gripping plates and a driving cylinder, the first row of products is adapted to be clamped between the pair of gripping plates.

7. The linking system of claim 6, wherein the driving cylinder is adapted to drive the pair of gripping plates to open or close, so as to release or clamp the first row of products.

8. The linking system of claim 1, wherein the holder includes a pair of clamping plates and a driver, the first row of products is adapted to be clamped between the pair of clamping plates.

9. The linking system of claim 8, wherein the driver is adapted to drive the pair of clamping plates to open or close, so as to release or clamp first the row of products.

10. The linking system of claim 1, wherein a hook is formed on a first side of each product of the first row of products and the second row of products, and a slot is formed on a second side of each product opposite the first side.

11. The linking system of claim 10, wherein the hook of a product of the first row of products is adapted to be latched into the slot of a product of the second row of products to link the first row of products and the second row of products together.

12. A linking system adapted to link a plurality of products, comprising:

a supply device having a tray with a slide slot adapted to load a first row of products therein;

a gripping device having a gripper adapted to grip the first row of products and a moving mechanism adapted to move the gripper; and a holder adapted to hold the first row of products, the gripping device is adapted to move the first row of products from the supply device to a holding position on the holder and the holder is adapted to hold the first row of products at the holding position, and the gripping device is further adapted to grip a second row of products from the supply device and link the second row of products to the first row of products held by the holder, wherein the supply device further includes:
a conveying mechanism configured to convey the second row of products from a first end of the tray into the slide slot of the tray after the first row of products on the tray is taken away by the gripping device; and
a driving device mounted on a second end of the tray opposite the first end of the tray and including a shaft inserted into the slide slot of the tray.

13. The linking system of claim 12, wherein an effective length of the slide slot is adjusted by controlling a length of the shaft extending into the slide slot, so that the effective length of the slide slot is consistent with a length of the first row of products or the second row of products.

14. The linking system of claim 12, wherein the moving mechanism includes a horizontal moving mechanism and a vertical moving mechanism mounted on the horizontal moving mechanism, the gripper is mounted on the vertical moving mechanism.

15. The linking system of claim 1, wherein the horizontal moving mechanism is a horizontal servo drive mechanism and the vertical moving mechanism is a vertical servo drive mechanism.

16. The linking system of claim 15, wherein the horizontal moving mechanism includes a horizontal rail, a first slider slidably mounted on the horizontal rail, and a first servo driving device adapted to drive the first slider to slide along the horizontal rail.

17. The linking system of claim 16, wherein the vertical moving mechanism includes a vertical rail, a second slider slidably mounted on the vertical rail, and a second servo driving device adapted to drive the second slider to slide along the vertical rail.

18. The linking system of claim 17, wherein the vertical rail is connected to the first slider and the gripper is mounted on the second slider of the vertical moving mechanism.

19. A linking system adapted to link a plurality of products, comprising:
a supply device having a tray with a slide slot adapted to load a first row of products therein;
a gripping device having a gripper adapted to grip the first row of products and a moving mechanism adapted to move the gripper; and
a holder adapted to hold the first row of products, the gripping device is adapted to move the first row of products from the supply device to a holding position on the holder and the holder is adapted to hold the first row of products at the holding position, and the gripping device is further adapted to grip a second row of products from the supply device and directly connect a product from the second row of products to a product of the first row of products for linking the second row of products to the first row of products held by the holder.

20. The linking system of claim 19, wherein each product of the first row of products and the second row of products defines a hook formed on a first side thereof and a slot formed on a second side thereof, opposite the first side, wherein the hook of a product of the first row of products is adapted to be latched into the slot of a product of the second row of products to link the first row of products and the second row of products together.

* * * * *